(12) United States Patent
Chowdhury

(10) Patent No.: US 6,776,120 B1
(45) Date of Patent: Aug. 17, 2004

(54) CONTROLLED COLLAPSE TEATCUP LINER

(76) Inventor: Mofazzal H. Chowdhury, 1301 Baitinger Ct., Sun Prairie, WI (US) 53590-1550

(*) Notice: Subject to any disclaimer, the term of this patent is extended or adjusted under 35 U.S.C. 154(b) by 0 days.

(21) Appl. No.: 10/359,823

(22) Filed: Feb. 7, 2003

Related U.S. Application Data (63) Continuation-in-part of application No. 10/071,332, filed on Feb. 8, 2002, now Pat. No. 6,631,694.
(60) Provisional application No. 60/355,103, filed on Feb. 8, 2002.

(51) Int. Cl.[7] ................................................. A01J 5/04
(52) U.S. Cl. .................................. 119/14.46; 119/14.47; 119/14.49
(58) Field of Search ........................... 119/14.46–14.49

(56) References Cited

U.S. PATENT DOCUMENTS

| | | | | |
|---|---|---|---|---|
| 2,099,884 A | * | 11/1937 | Green ...................... | 119/14.51 |
| 2,997,980 A | * | 8/1961 | Noorlander ............... | 119/14.52 |
| 3,096,740 A | | 7/1963 | Noorlander ............... | 119/14.52 |
| 3,289,634 A | | 12/1966 | Simons ..................... | 119/14.52 |
| 3,659,558 A | | 5/1972 | Noorlander ............... | 119/14.52 |
| 3,696,790 A | * | 10/1972 | Albright ................... | 119/14.47 |
| 3,967,587 A | | 7/1976 | Noorlander ............... | 119/14.49 |
| 3,973,521 A | * | 8/1976 | Duncan ..................... | 119/14.47 |
| 4,269,143 A | | 5/1981 | Erbach ...................... | 119/14.49 |
| 4,457,262 A | * | 7/1984 | Mills ........................ | 119/14.47 |
| 4,459,939 A | * | 7/1984 | Noorlander ............... | 119/14.49 |
| 4,530,307 A | | 7/1985 | Thompson ................ | 119/14.49 |
| 4,537,152 A | | 8/1985 | Thompson ................ | 119/14.54 |
| 4,572,106 A | * | 2/1986 | Mills ........................ | 119/14.47 |
| 4,610,220 A | | 9/1986 | Goldberg et al. ......... | 119/14.47 |
| 4,648,350 A | * | 3/1987 | Noorlander ............... | 119/14.32 |
| 5,069,162 A | * | 12/1991 | Thompson et al. ....... | 119/14.47 |
| 5,178,095 A | | 1/1993 | Mein ........................ | 119/14.47 |
| 5,218,924 A | | 6/1993 | Thompson et al. ....... | 119/14.02 |
| 5,224,442 A | * | 7/1993 | Davies ..................... | 119/14.49 |
| 5,291,853 A | | 3/1994 | Steingraber et al. ...... | 119/14.54 |
| 5,482,004 A | | 1/1996 | Chowdhury .............. | 119/14.52 |
| 5,493,995 A | | 2/1996 | Chowdhury .............. | 119/14.54 |
| 5,752,462 A | | 5/1998 | Petersson ................. | 119/14.47 |
| 6,039,001 A | | 3/2000 | Sanford .................... | 19/14.47 |
| 6,055,931 A | | 5/2000 | Sanford, Jr. .............. | 119/14.36 |
| 6,308,656 B1 | | 10/2001 | Milbrath et al. .......... | 119/14.47 |
| 6,427,625 B1 | * | 8/2002 | Schuster ................... | 119/14.47 |
| 6,435,132 B1 | | 8/2002 | Milbrath et al. .......... | 119/14.47 |
| 6,631,694 B1 | * | 10/2003 | Chowdhury .............. | 119/14.46 |

* cited by examiner

*Primary Examiner*—Charles T. Jordan
*Assistant Examiner*—Bret Hayes
(74) *Attorney, Agent, or Firm*—Andrus, Sceales, Starke & Sawall, LLP (57) ABSTRACT

A teatcup liner and teatcup assembly are provided with controlled collapse constructions including ribs, notches, sleeves, and thickness variations.

28 Claims, 13 Drawing Sheets

CONTROLLED COLLAPSE TEATCUP LINER

CROSS-REFERENCE TO RELATED APPLICATIONS

This application is a continuation-in-part of U.S. patent application Ser. No. 10/071,332, filed Feb. 8, 2002, now U.S. Pat. No. 6,631,694. This application also claims priority from Provisional U.S. Patent Application Serial. No. 60/355,103, filed Feb. 8, 2002.

BACKGROUND AND SUMMARY

Parent Application

The parent invention relates to teatcup liners for use in a teatcup assembly for milking a mammal.

As known in the prior art, a plurality of teatcups are connected to respective teats suspending from the udder of a mammal such as a cow. Each teatcup assembly has a teatcup liner or inflation around a respective teat and defining a milk flow passage within the liner below the teat, and a pulsation chamber outside the liner between the liner and the teatcup shell, for example U.S. Pat. Nos. 4,269,143, 4,530,307, 5,178,095, 5,218,924, 6,055,931, all incorporated herein by reference. The system has a milking cycle with an on portion and an off portion. Milk flows from the teat towards a milking claw during the on portion, and then to a storage vessel. During the off portion, the liner is collapsed around the teat, to aid in the circulation of body fluids. Vacuum is continuously applied to the milk flow passage within the liner. Vacuum is alternately and cyclically applied to the pulsation chamber between the liner and the teatcup shell, to open and close the liner, all as is known.

The parent invention provides a liner series or family enabling the dairyman selectivity in choosing between the trade-off of liner slip versus milk harvest and milking speed. During continuing development efforts, various relationships have been discovered between various liner parameters, and in accordance therewith, a liner series has been developed having at least one and preferably a plurality of parameters which vary liner to liner in optimized manner to afford the noted selectivity.

In a further aspect of the parent invention, a particularly cost effective manufacturing method is provided for producing the liner series.

Present Invention

The present invention arose during continuing development efforts, including related to the noted parent invention. The present invention provides various teatcup liner constructions for desirably controlling collapse of the teatcup liner.

BRIEF DESCRIPTION OF THE DRAWINGS

Parent Application

Present Application

DETAILED DESCRIPTION OF THE INVENTION

Parent Application

Figure 1:
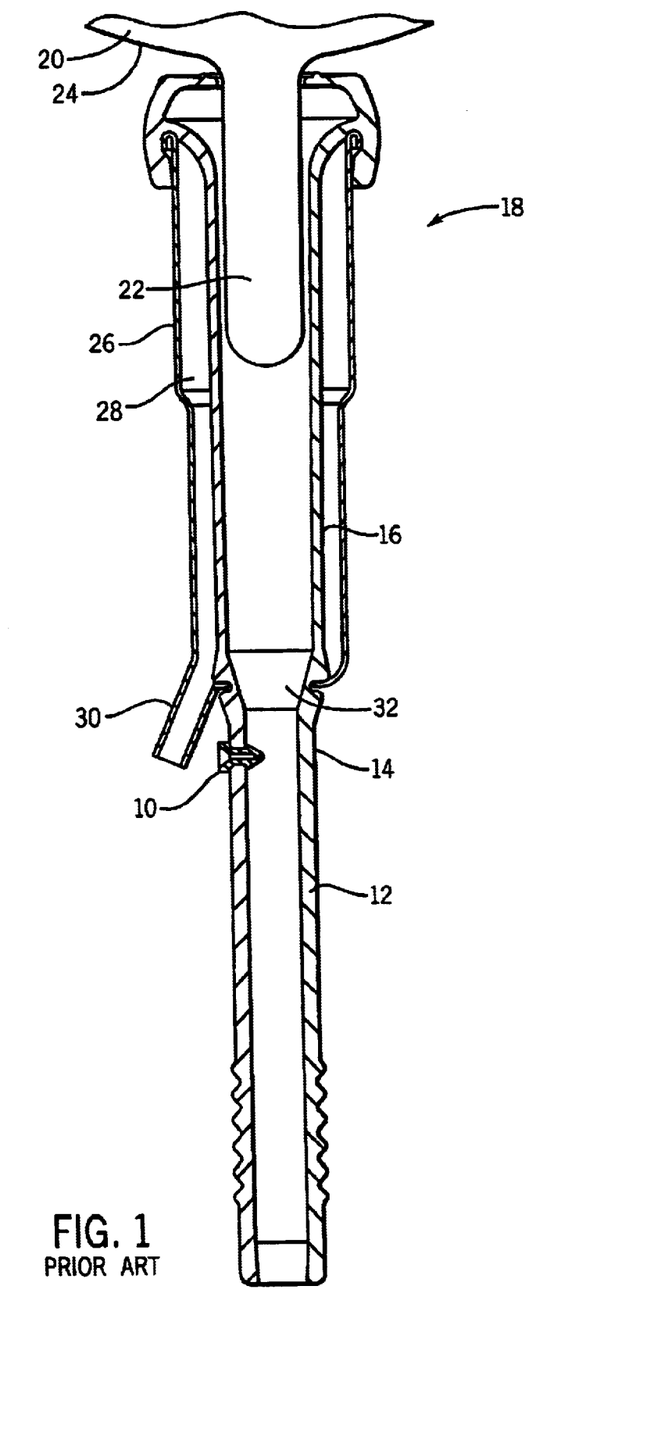
FIG. 1 is taken from U.S. Pat. No. 6,055,931 and is a side view partially in section of a teatcup assembly including a teatcup liner for milking a mammal.
Figure 2:
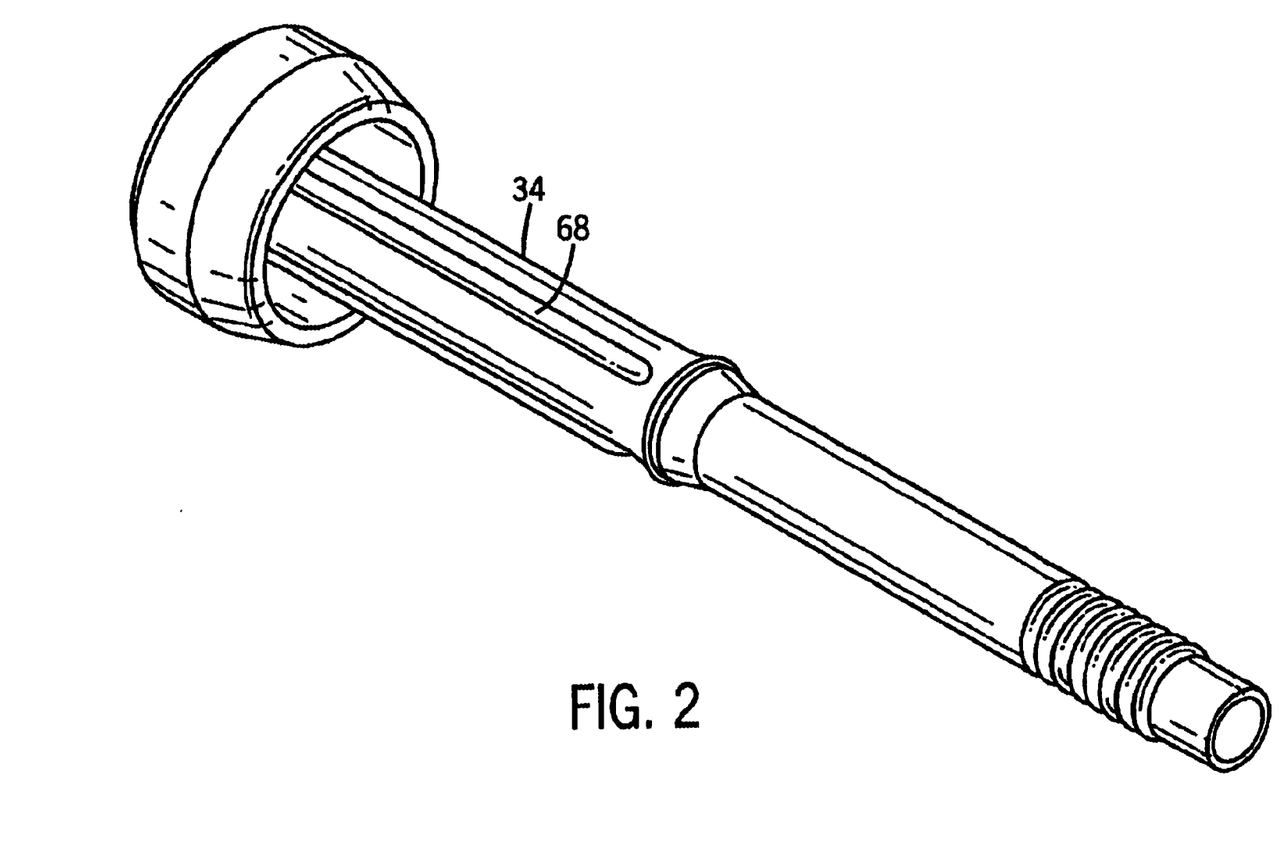
FIG. 2 is an isometric view of a teatcup liner.

FIG. 1 shows a teatcup assembly 18 for milking a mammal 20 such as a cow. Teat 22 suspending from udder 24 of the mammal extends into the liner. Teatcup shell 26 is typically a metal, or plastic, member defining an annular pulsation chamber 28 around liner 16 between the liner and the teatcup shell and having a pulsation port 30 for connection to a pulsator valve, as is known. Liner 16 is typically rubber or other flexible material. The lower end of milk tube portion 14 of the liner is connection to a claw, for example U.S. Pat. Nos. 4,537,152 and 5,291,853, incorporated herein by reference, which in turn supplies milk to a storage vessel. As noted above, vacuum is continuously applied to milk passage 32 within the liner through milk tube portion 14, and vacuum is alternately and cyclically applied to pulsation chamber 28 through port 30, to open and close liner 16 below teat 22, all as is known and for which further reference may be had to the above noted incorporated patents. An air vent plug 10 may be inserted through the wall 12 of the milk tube portion 14 of the teat liner, as is known, for example above noted incorporated U.S. Pat. No. 6,055,931. For further background, a teat liner is illustrated in isometric view at 34 in FIG. 2.

Figure 3:
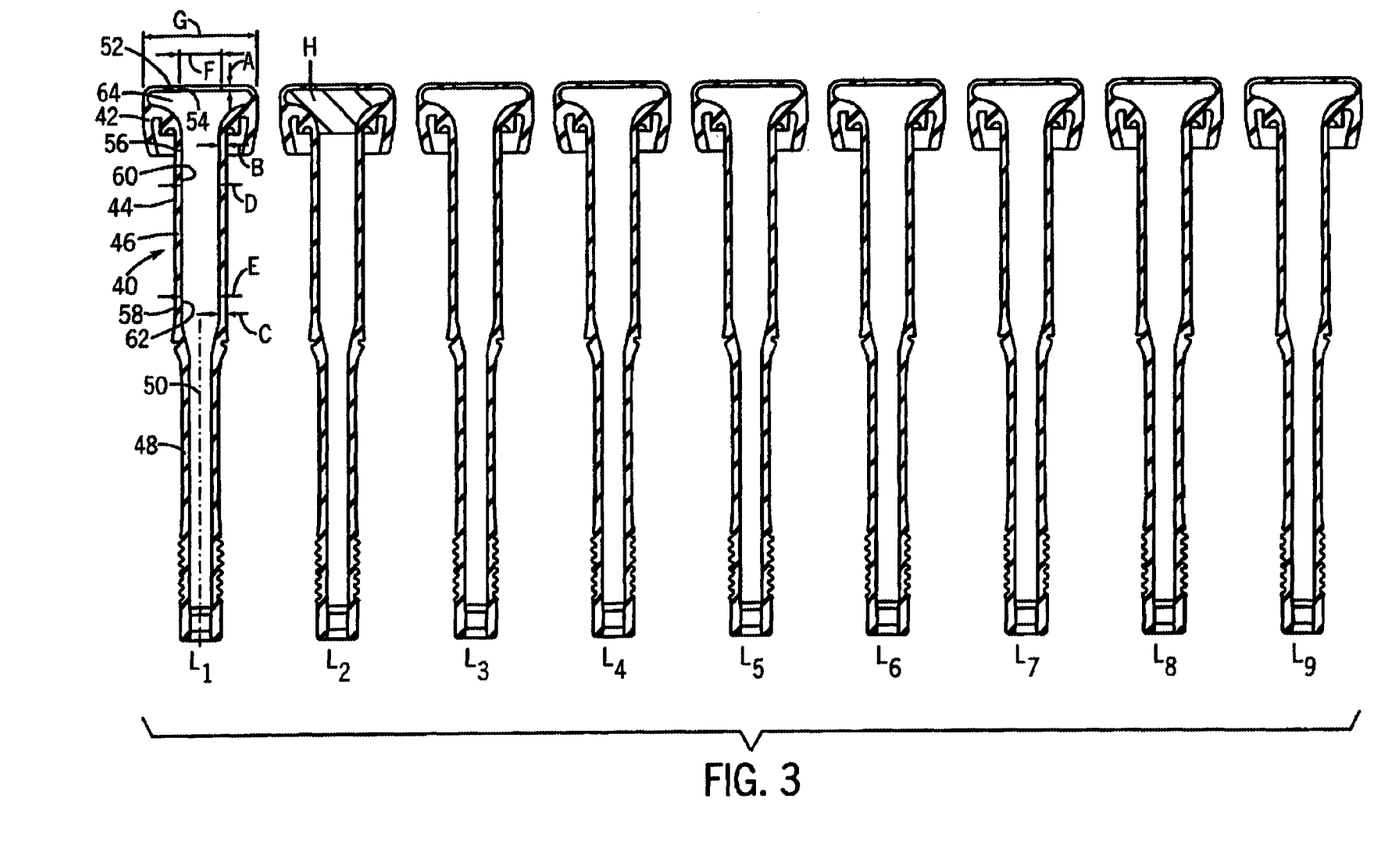
FIG. 3 shows a teatcup liner series in accordance with the parent invention.

FIG. 3 illustrates a teatcup liner series in accordance with the parent invention including in combination a plurality of related teatcup liners comprising n liners $L_1$ through $L_n$, for example as shown at the nine liners $L_1$ through $L_9$. Each liner such as 40 has an upper mouthpiece 42, an intermediate barrel 44 defined by a barrel wall 46, and a lower connecting tube 48. The barrel extends along an axial direction 50 for receiving teat 22 inserted axially thereinto through mouthpiece 42. The mouthpiece has an upper lip 52 having an aperture 54 therethrough for receiving teat 22. Lip 52 has an axial thickness A measured parallel to axial direction 50. Barrel wall 46 has axially spaced upper and lower portions 56 and 58. Upper portion 56 of barrel wall 46 has a transverse thickness B measured transversely to axial direction 50. Lower portion 58 of barrel wall 46 has a transverse thickness C measured transversely to axial direction 50. Upper portion 56 of barrel wall 46 has inner surfaces 60 defining a hollow interior with an upper transverse span D thereacross taken transversely to axial direction 50. Lower portion 58 of barrel wall 46 has inner surfaces 62 defining a hollow interior with a lower transverse span E thereacross taken transversely to axial direction 50. Lip aperture 54 has a transverse dimension taken transversely to axial direction 50 and defining a mouthpiece bore F. Mouthpiece 42 has a cavity 64 between lip 52 and barrel 44. Cavity 64 has a transverse dimension taken transversely to axial direction 50 and defining a cavity bore G. Cavity 64 has a volume H.

In one preferred embodiment, the noted parameters A through H are varied liner to liner from $L_1$ through $L_9$ as indicated in the table below, and as set forth in FIG. 3. The table below gives dimensions for A through G in millimeters (mm). For example, the axial thickness A of lip 52 varies from 2.0 mm for liner $L_1$ to 3.6 mm for liner $L_9$. The table gives dimensions in cubic inches ($in^3$) for H.

thickness and the noted transverse span are tapered. In alternate embodiments, the barrel wall thickness and/or the transverse span may be untapered, i.e. straight.

Figures 4, 5:
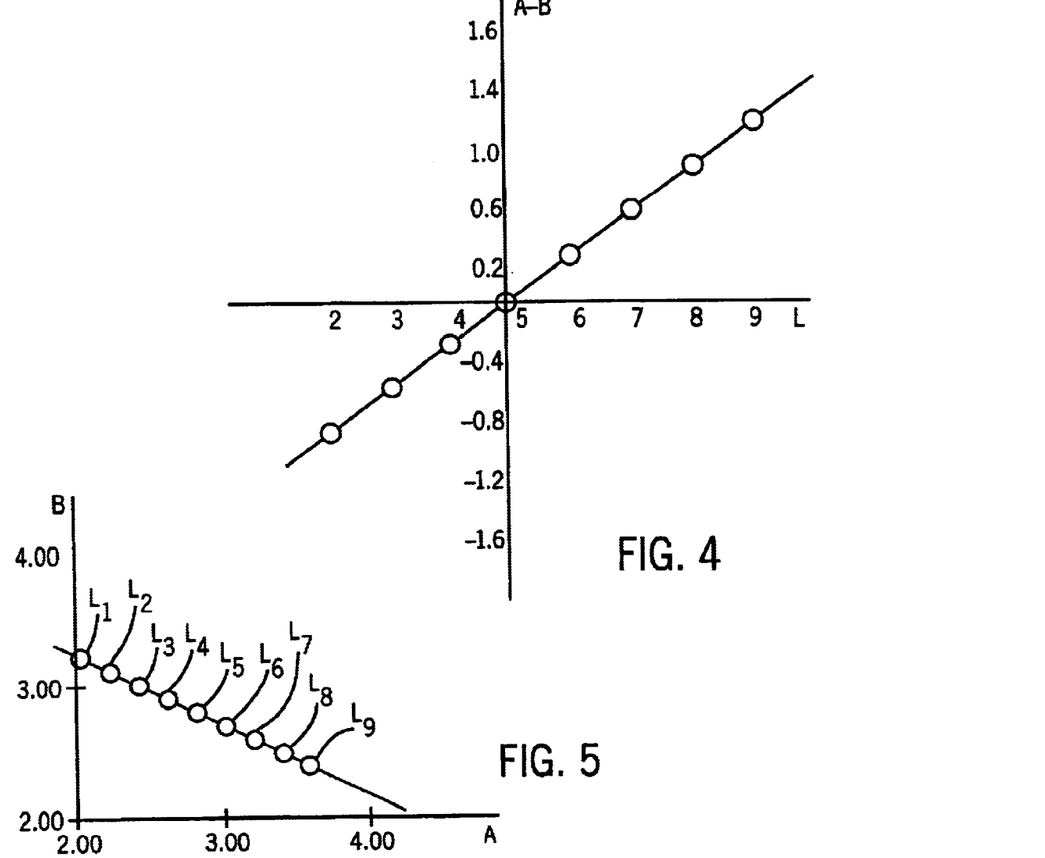
FIG. 4 is a graphical plot of a selected parameter which varies in accordance with the parent invention.
FIG. 5 is a graphical plot of the variance of a pair of parameters versus each other in accordance with the parent invention.

Further, in the preferred embodiment, the parameter A–B, i.e. the difference between A and B, varies as illustrated in the table, namely such difference continually increases from $L_1$ through $L_9$, preferably linearly, as further illustrated in FIG. 4.

Further, in the preferred embodiment, in a plot, FIG. 5, of transverse thickness B of barrel wall 46 versus axial thickness A of lip 52 for liners $L_1$ through $L_9$, B decreases as A increases. Further preferably, B decreases linearly with respect to A.

Figure 6:
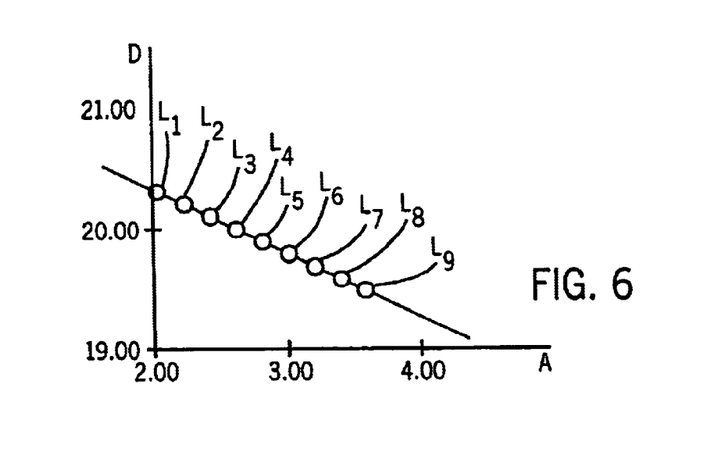
FIG. 6 is a graphical plot of the variance of another pair of parameters versus each other in accordance with the parent invention.

Further in the preferred embodiment, in a plot, FIG. 6, of transverse span D versus axial thickness A of lip 52 for $L_1$ through $L_9$, D decreases as A increases. Further preferably, D decreases linearly with respect to A.

Figure 7:
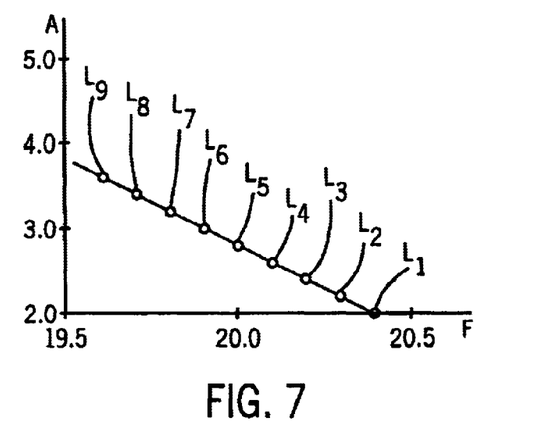
FIG. 7 is a graphical plot of the variance of another pair of parameters versus each other in accordance with the parent invention.

Further in the preferred embodiment, in a plot, FIG. 7, of axial thickness A of lip 52 versus mouthpiece bore F for $L_1$ through $L_9$, axial thickness A decreases as mouthpiece bore F increases. Further preferably, A decreases linearly with respect to F.

Figure 8:
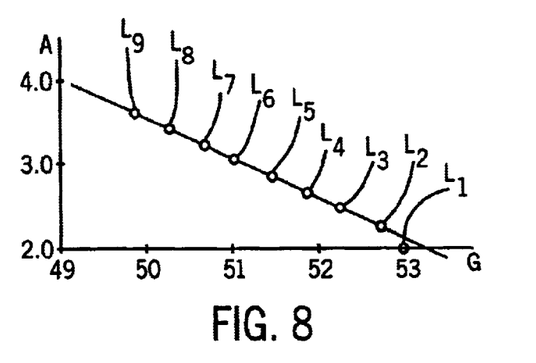
FIG. 8 is a graphical plot of the variance of another pair of parameters versus each other in accordance with the parent invention.

Further in the preferred embodiment, in a plot, FIG. 8, of axial thickness A of lip 52 versus cavity bore G for $L_1$ through $L_9$, axial thickness A decreases as cavity bore G increases. Further preferably, A decreases linearly with respect to G.

Figure 9:
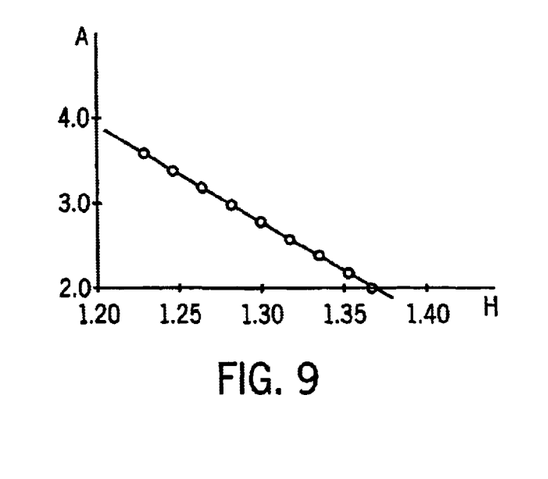
FIG. 9 is a graphical plot of the variance of another pair of parameters versus each other in accordance with the parent invention.

Further in the preferred embodiment, in a plot, FIG. 9, of axial thickness A of lip 52 versus cavity volume H for $L_1$ through $L_9$, axial thickness A decreases as cavity volume H increases. Further preferably, A decreases linearly with respect to H.

The disclosed combination enables selection of desired milking characteristics. Liner $L_1$ provides the highest milk harvest and highest milk speed, but also the greatest liner slip. Liner $L_9$ provides the lowest liner slip and also the lowest milk harvest and milking speed. The dairyman can choose the right balance and trade-off for his particular needs. As he moves left to right in FIG. 3, liner slip reduces

TABLE

| | LINER | | | | | | | | |
|---|---|---|---|---|---|---|---|---|---|
| | $L_1$ | $L_2$ | $L_3$ | $L_4$ | $L_5$ | $L_6$ | $L_7$ | $L_8$ | $L_9$ |
| A (mm) | 2.0 | 2.2 | 2.4 | 2.6 | 2.8 | 3 | 3.2 | 3.4 | 3.6 |
| B (mm) | 3.2 | 3.1 | 3.0 | 2.9 | 2.8 | 2.7 | 2.6 | 2.5 | 2.4 |
| C (mm) | 2.9 | 2.8 | 2.7 | 2.6 | 2.5 | 2.4 | 2.3 | 2.2 | 2.1 |
| D (mm) | 20.2 | 20.4 | 20.6 | 20.8 | 21 | 21.2 | 21.4 | 21.6 | 21.8 |
| E (mm) | 18.9 | 19.1 | 19.3 | 19.5 | 19.7 | 19.9 | 20.1 | 20.3 | 20.5 |
| F (mm) | 20.4 | 20.3 | 20.2 | 20.1 | 20.0 | 19.9 | 19.8 | 19.7 | 19.6 |
| G (mm) | 52.95 | 52.65 | 52.25 | 51.85 | 51.45 | 51.05 | 50.65 | 50.25 | 49.85 |
| H ($in^3$) | 1.368 | 1.353 | 1.336 | 1.318 | 1.301 | 1.283 | 1.265 | 1.248 | 1.230 |
| A–B (mm) | −1.2 | −0.9 | −0.6 | −0.3 | 0 | 0.3 | 0.6 | 0.9 | 1.2 |

The liner series is characterized by the following relationships, as illustrated in the table and FIG. 3: axial thickness A of lip 52 continually increases from $L_1$ through $L_n$, preferably linearly; transverse thickness of barrel wall 46, including both B and C, continually decreases from $L_1$ through $L_n$, preferably linearly; the transverse span across the hollow interior, including both D and E, continually increases from $L_1$ through $L_n$, preferably linearly; mouthpiece bore F continually decreases from $L_1$ through $L_n$, preferably linearly; cavity bore G continually decreases from $L_1$ through $L_n$, preferably linearly; cavity volume H continually decreases from $L_1$ through $L_n$.

In the preferred embodiment, B is always greater than C, and D is always greater than E, such that both the barrel wall as does milk harvest and milking speed. As he moves right to left in FIG. 3, liner slip increases as does milk harvest and milking speed.

Figure 10:
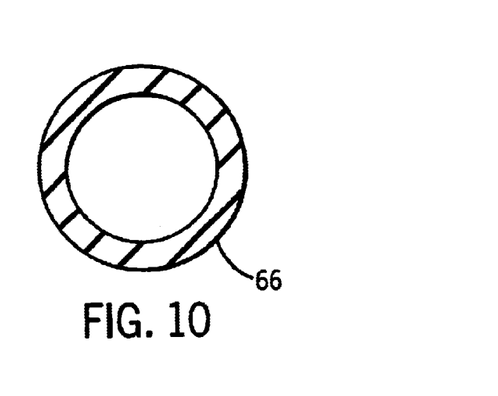
FIG. 10 is a cross-sectional view of a liner.
Figure 11:
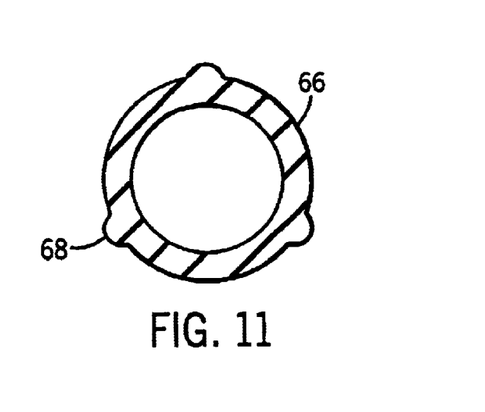
FIG. 11 is like FIG. 10 and shows another embodiment.
Figure 12:
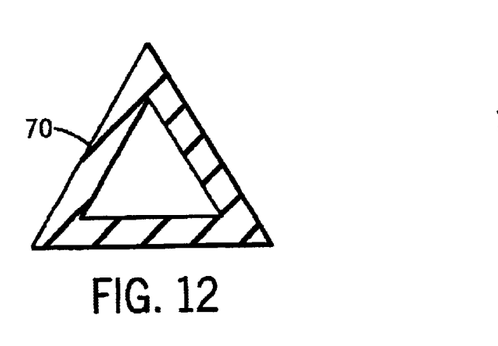
FIG. 12 is like FIG. 10 and shows another embodiment.
Figure 13:
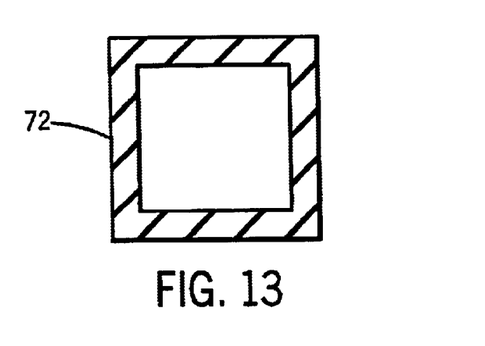
FIG. 13 is like FIG. 10 and shows another embodiment.
Figure 14:
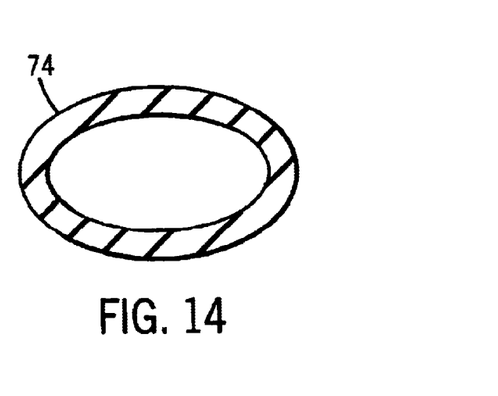
FIG. 14 is like FIG. 10 and shows another embodiment.
Figure 15:
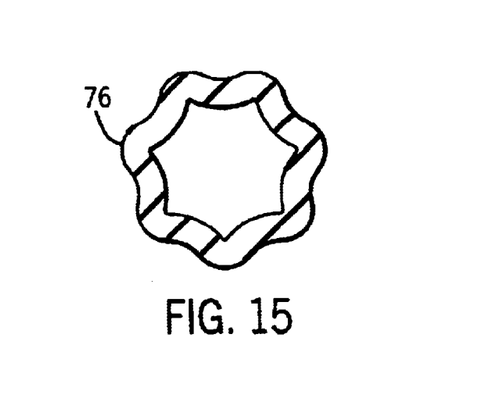
FIG. 15 is like FIG. 10 and shows another embodiment.

The liner is preferably round as shown at 66 in FIG. 10. The liner may additionally include a plurality of ribs such as 68, FIGS. 11 and 2, extending axially along the barrel. The ribs may be external as shown, and/or internal. The liner may be triangular as shown at 70 in FIG. 12. The liner may be square as shown at 72 in FIG. 13. The liner may be oval as shown at 74 in FIG. 14. The liner may be fluted as shown at 76 in FIG. 15.

The various combinations of parameters providing the noted selectivity of milking characteristics are set forth in the claims. Deflection of lip 52 is varied by parameter A, and may additionally or alternately be varied by varying the shore hardness of the lip material. Liner barrel tension is varied by varying the noted wall thickness B and C, and may alternately or additionally be varied by the addition of the noted ribs and/or changing the cross-section of individual ribs and/or changing liner material and/or changing barrel length.

Figure 16:
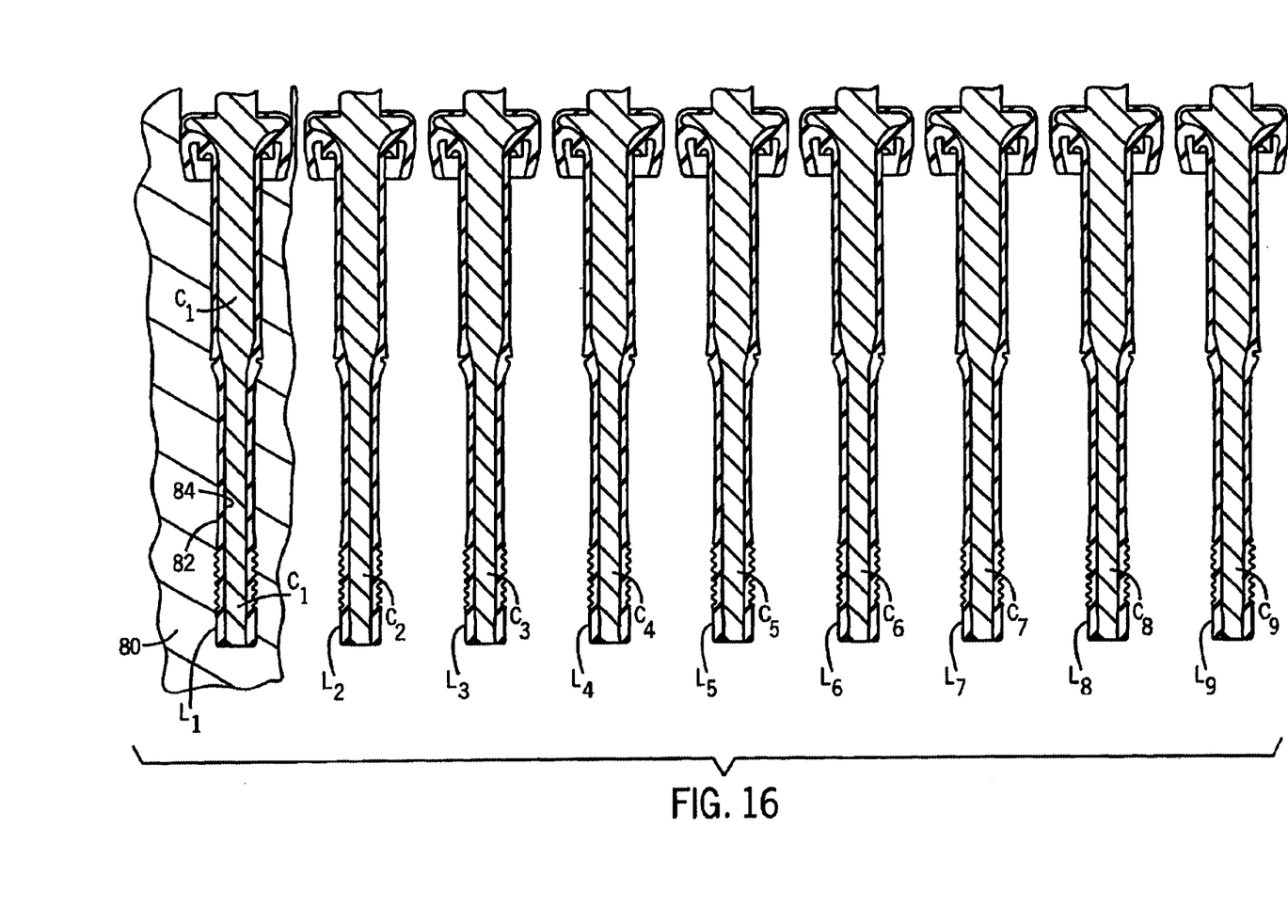
FIG. 16 is like FIG. 3 and illustrates a manufacturing method in accordance with the parent invention.

There is further provided a simple and particularly cost effective and economical manufacturing method for making the teatcup liner series. The method involves: forming a first of the liners $L_1$ in a mold 80, FIG. 16, having a first removable core $C_1$ inserted therein, the mold forming the outer profile surface 82 of liner $L_1$, the core $C_1$ forming the inner profile surface 84 of liner $L_1$; forming a second of the liners $L_2$ in the same mold 80 having a second removable core $C_2$ inserted therein, the mold 80 forming the outer profile surface 86 of liner $L_2$, the core $C_2$ forming the inner profile surface 88 of liner $L_2$; forming the remainder of the liners through $L_n$, e.g. $L_3$ through $L_9$, in the same mold 80 having respective removable cores through $C_n$, e.g. $C_3$ through $C_9$, inserted therein, the mold 80 forming the outer profile surface of the liners through $L_n$, the cores through $C_n$ forming the inner profile surfaces of the liners through $L_n$, e.g. cores $C_3$ through $C_9$ form the inner profile surfaces for liners $L_3$ through $L_9$, respectively. The same mold 80 is used for each of the liners $L_1$ through $L_9$. The outer profile surface is the same for each of liners $L_1$ through $L_9$. Different cores $C_1$ through $C_9$ are used for liners $L_1$ through $L_9$. The inner profile surface is different from liner to liner according to $C_1$ through $C_9$. Any or all or some combination of the noted parameters A–H are varied liner to liner according to $C_1$ through $C_9$. The cores change a selected dimensional parameter or parameters. This is particularly desirable from a manufacturing standpoint because of the savings in tooling cost by using a single mold to produce the liner series, rather than multiple molds, i.e. one for each liner. Instead, different cores are used to provide the variance liner to liner in the series. Cores are significantly less expensive than a mold.

Present Invention

Figure 17:
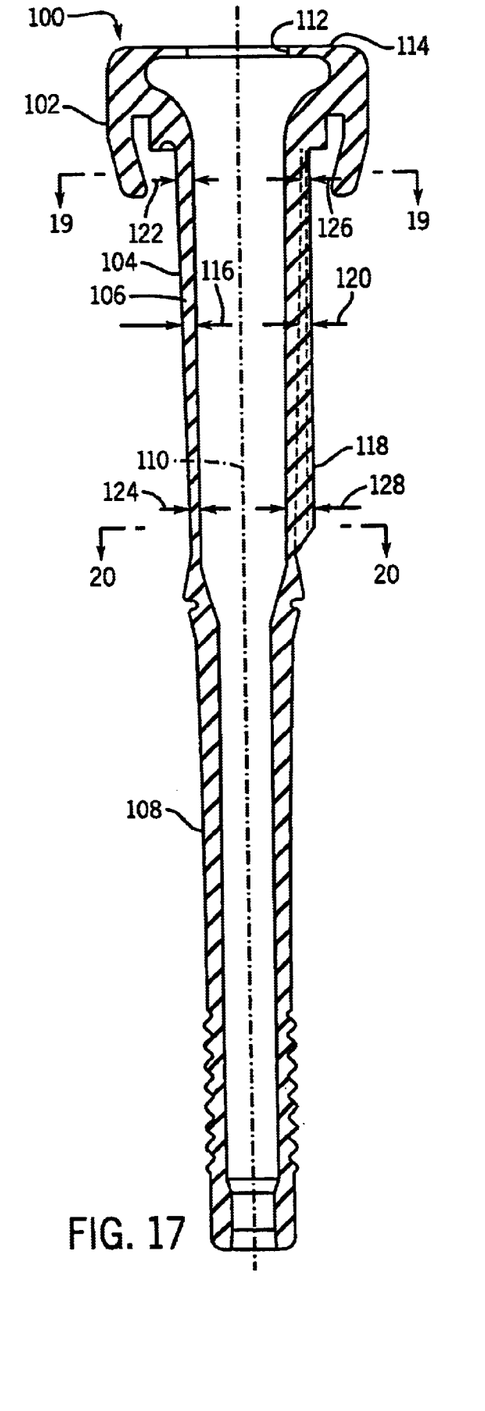
FIG. 17 is like FIG. 1 and shows the present invention.
Figure 18:
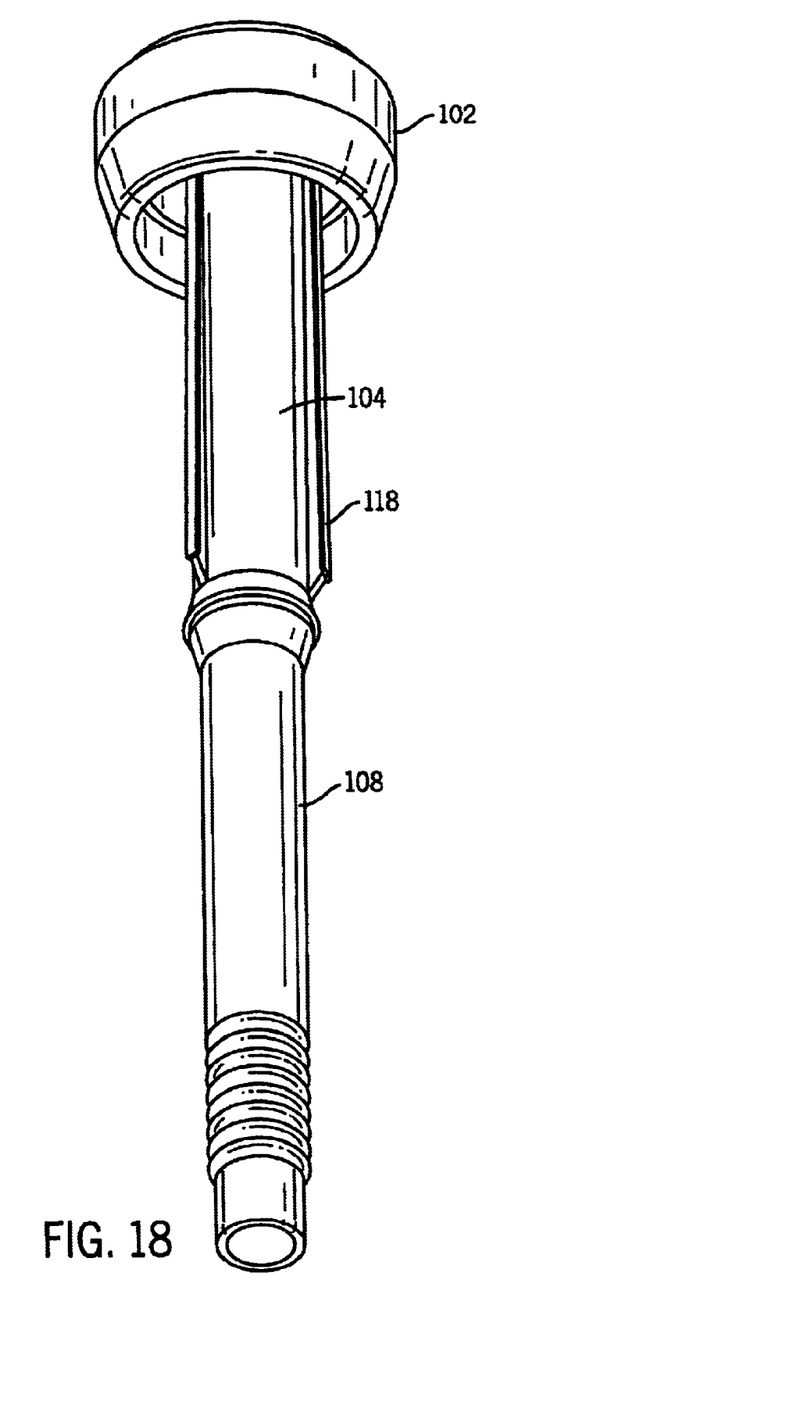
FIG. 18 is like FIG. 2 and shows the present invention.
Figure 19:
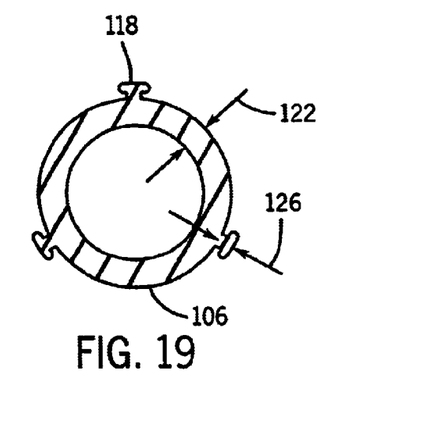
FIG. 19 is a sectional view taken along line 19—19 of FIG. 17.
Figure 20:
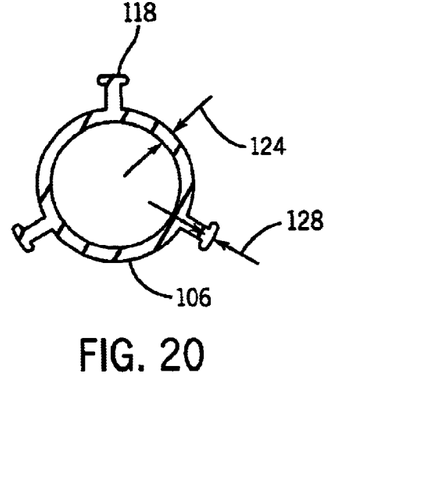
FIG. 20 is a sectional view taken along line 20—20 of FIG. 17.
Figure 21:
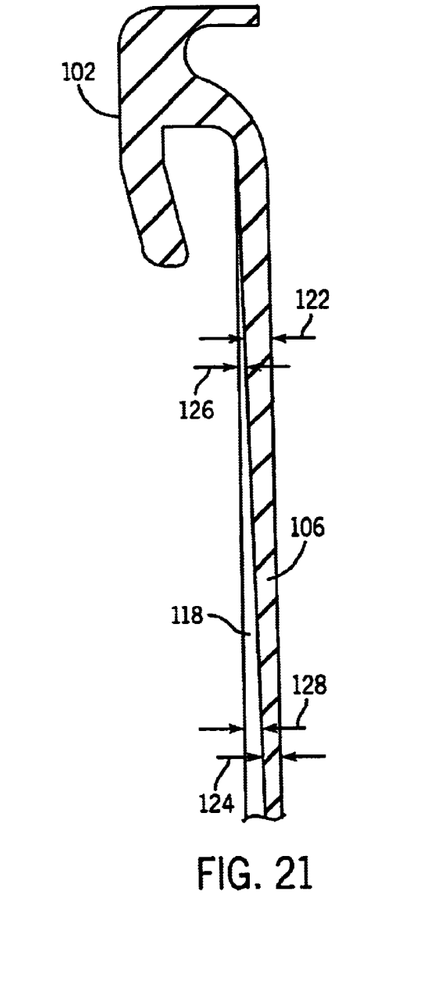
FIG. 21 is a schematic view of a portion of FIG. 17.

FIGS. 17 and 18 show a teatcup liner 100 in accordance with the present invention. The liner has an upper mouthpiece 102, a barrel 104 depending downwardly from the upper mouthpiece and defined by a barrel wall 106, and a lower connecting tube 108 depending downwardly from the barrel. The barrel extends axially along an axis 110 for receiving teat 22, FIG. 1, inserted axially thereinto through the mouthpiece at lip aperture 112 of mouthpiece lip 114. Barrel wall 106 has a wall thickness 116 transverse to axis 110. A plurality of ribs 118, for example three such ribs, extend axially along barrel wall 106 and have a rib thickness 120 transverse to axis 110. At least one of the wall thickness 116 and the rib thickness 120 varies as the barrel and the ribs extend axially, and in preferred form, both such thicknesses 116 and 120 vary. Barrel wall thickness 116 varies from a larger thickness 122 to a smaller thickness 124 as barrel wall 106 extends axially downwardly away from mouthpiece 102. Reference is made to the cross-sectional views in FIGS. 19 and 20 showing the noted different barrel wall thicknesses 122 and 124. Rib thickness 120 varies from smaller thicknesses 126 to larger thicknesses 128 as rib 118 extends axially downwardly away from mouthpiece 102. Reference is made to the cross-sectional views in FIGS. 19 and 20 showing this variance in rib thickness from 126 in FIG. 19 to 128 in FIG. 20. FIG. 21 is a schematic sectional view further illustrating the reverse tapering of rib 118 relative to barrel wall 106, showing that rib 118 becomes thicker and barrel wall 106 becomes thinner as they extend axially downwardly away from mouthpiece 102.

Figure 22:
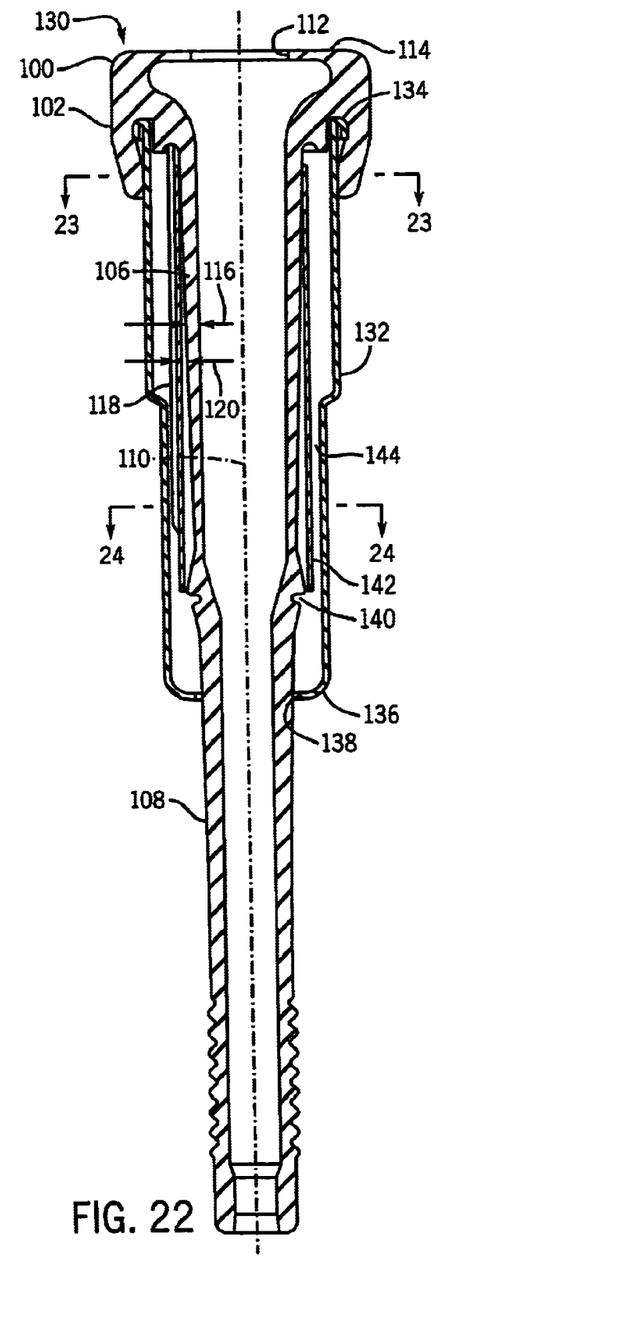
FIG. 22 is like FIG. 17 and shows a teatcup assembly in accordance with the invention.
Figure 23:
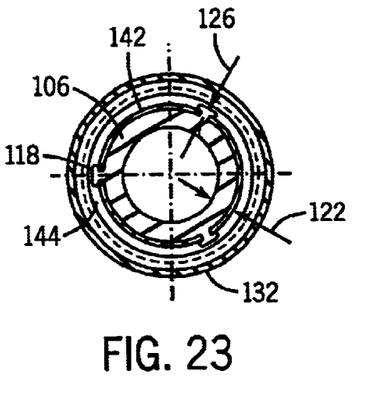
FIG. 23 is a sectional view taken along line 23—23 of FIG. 22.
Figure 24:
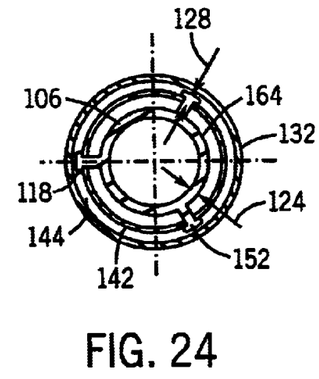
FIG. 24 is a sectional view taken along line 24—24 of FIG. 22.

FIGS. 22–25 show a further embodiment and use like reference numerals from above where appropriate to facilitate understanding. FIG. 22 shows a teatcup assembly 130 including an outer teatcup shell 132, like shell 26 in FIG. 1, having a top end 134 and a bottom end 136. Connecting tube 108 of teatcup liner 100 extends through aperture 138 in bottom end 136 of the shell. FIG. 22 shows a partially assembled position. Assembly is completed by pulling connecting tube 108 rightwardly to seat annular groove 140 in aperture 138, to the completed assembled condition shown in FIG. 1. Teatcup liner 100 includes the noted upper mouthpiece 102, barrel 104 depending downwardly from mouthpiece 102, and connecting tube 108 depending downwardly from barrel 104. Mouthpiece 102 is at top end 134 of teatcup shell 132. Barrel 104 extends axially along axis 110 for receiving teat 22, FIG. 1, inserted axially thereinto through mouthpiece 102, namely through lip aperture 112 of mouthpiece lip 114. Barrel 102 has the noted plurality of ribs 118 extending axially therealong and projecting radially outwardly therefrom. A sleeve 142 is provided in teatcup shell 132 in the annular space 144 between teatcup shell 132 and barrel 104. Sleeve 142 engages ribs 118 in interference fit, to be described.

Figure 25:
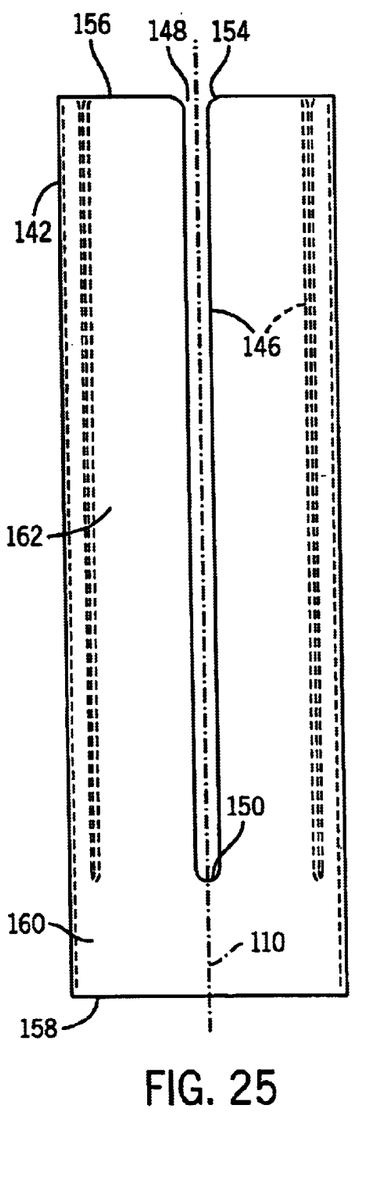
FIG. 25 is a side elevation view of one of the components of FIG. 22.

Sleeve 142 is a tubular member having a plurality of axially extending slots 146, FIG. 25, receiving ribs 118, preferably three slots if there are three ribs. Each slot has a first open axial end 148 receiving a respective rib 118 axially slidable thereinto. Each slot has a distally opposite second closed axial end 150 blocking axial sliding of a respective rib 118 therepast. Ribs 118 have enlarged outer ends 152, FIG. 24, retaining the rib in the respective slot. Open axial end 148 has a beveled entrance 154 receiving and guiding the respective rib 118 therein. Sleeve 142 has a top end 156 at open axial ends 148 of slots 146, and has a bottom end 158 axially spaced below closed axial ends 150 of slots 146. Sleeve 142 has a portion 160 between closed axial ends 150 of the slots and bottom end 158 of the sleeve, which portion 160 is a continuous band around the perimeter of the sleeve structurally supporting portions such as 162 of the sleeve extending axially upwardly therefrom between slots 146, such that sleeve 142 is a one-piece member.

Sleeve 142 is mounted to teatcup liner 100 prior to insertion into outer teatcup shell 132. Sleeve 142 is slid axially upwardly onto and around teatcup liner 100 such that slots 146 slide upwardly along ribs 118, trapping the ribs therein against radial movement due to outer enlarged portions 152, FIG. 24. Sleeve 142 is thus mounted to teatcup liner 100 and circumscribes barrel 104. This subassembly of sleeve 142 and teatcup liner 100 is then inserted as a unit into teatcup shell 132, and is removable as a unit from teatcup shell 132. The assembled subassembly of sleeve 142 and teatcup liner 100 is inserted downwardly into teatcup shell 132. This is desirable because it enables use of standard teatcup shells 132 without modifying the latter to retain ribs 118 against radial inward collapse. The liner collapses along sections such as 164, FIG. 24, between the ribs, which, in the case of three ribs, provides triangular collapse.

Barrel wall 106, FIG. 22 has the noted wall thickness 116, FIG. 17, transverse to axis 110. Ribs 118 have the noted rib thickness 120, FIG. 17, transverse to axis 110. At least one and preferably both of wall thickness 116 and rib thickness 120 in FIG. 22 vary as barrel 104 and ribs 118 extend axially. As shown in the sectional views in FIGS. 23 and 24, barrel wall thickness varies from larger thicknesses 122, FIG. 23, to smaller thicknesses 124, FIG. 24, as barrel 104 extends axially downwardly away from mouthpiece 102. The rib thickness varies from smaller thicknesses 126, FIG. 23, to larger thicknesses 128, FIG. 24, as ribs 118 extend axially downwardly away from mouthpiece 102.

Figure 26:
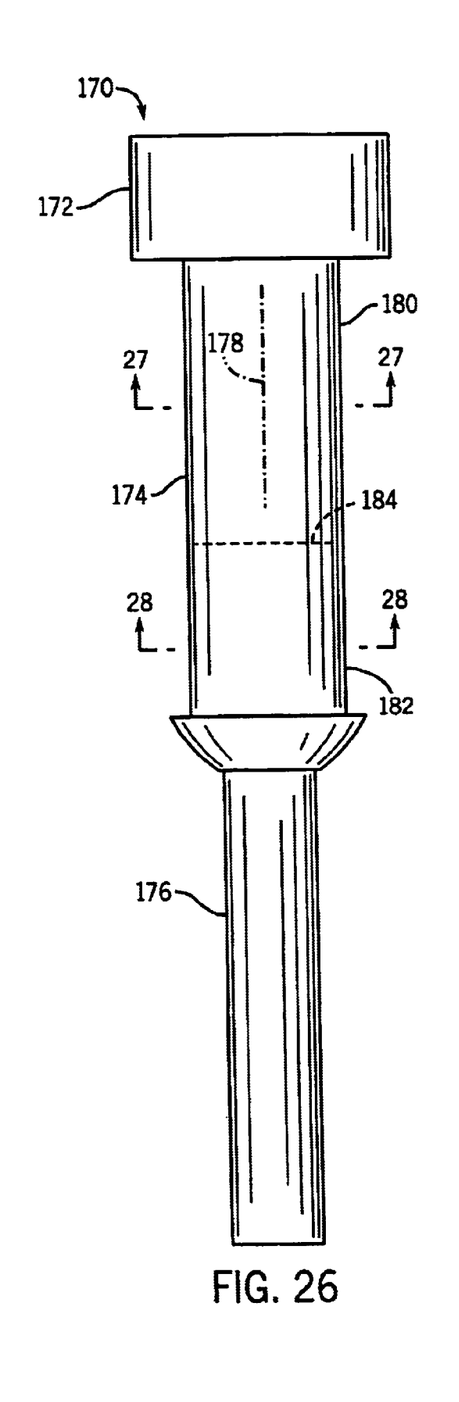
FIG. 26 is a schematic side elevation view of another embodiment of a teatcup liner in accordance with the invention.
Figure 27:
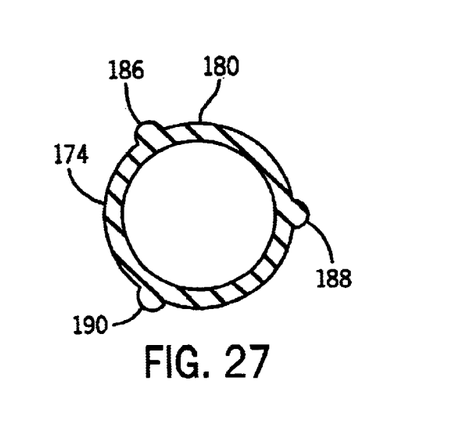
FIG. 27 is a sectional view taken along line 27—27 of FIG. 26.

FIG. 26 schematically shows another teatcup liner 170 including an upper mouthpiece 172, a barrel 174 depending downwardly from upper mouthpiece 172, and a lower connecting tube 176 depending downwardly from barrel 174. Barrel 174 extends axially along an axis 178 for receiving teat 22, FIG. 1, inserted axially thereinto through mouthpiece 172, as above. Barrel 174 has an upper section 180 and a lower section 182. Upper section 180 is round in lateral cross-section taken transversely to axis 178, as shown at the sectional view in FIG. 27. Lower section 182 is triangular in lateral cross-section taken transversely through axis 178, as shown in the sectional view in FIG. 28. The shape of barrel 174 transitions from upper round section 180 to lower triangular section 182 at transition zone 184. In one embodiment, a plurality of ribs extend axially along barrel 174 along at least one of the upper and lower sections, for example ribs 186, 188, 190 along upper section 180, and ribs 192, 194, 196 along lower section 182, for example three ribs each, though other numbers of ribs may be used.

Figures 29, 30, 31:
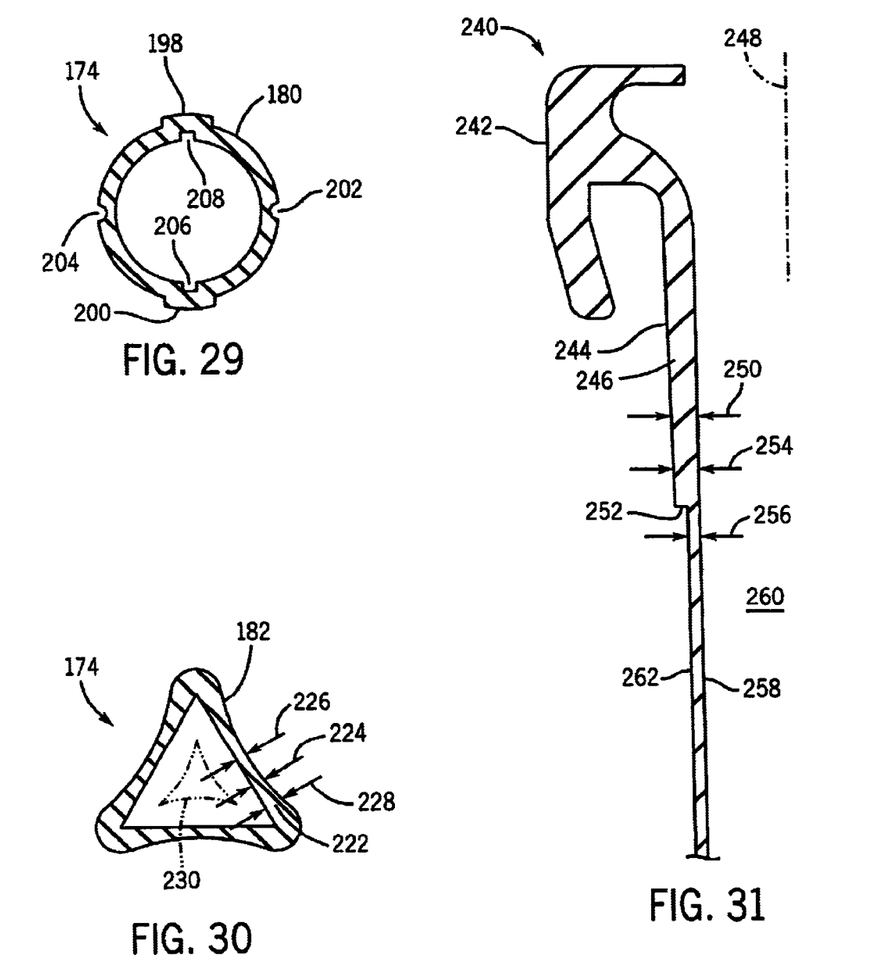
FIG. 29 is like FIG. 27 and shows another embodiment.
FIG. 30 is like FIG. 28 and shows another embodiment.
FIG. 31 is like FIG. 21 and shows another embodiment.

In a further embodiment, FIG. 29, upper section 180 has two ribs 198, 200 extending axially therealong, for fostering flat bi-symmetrical liner collapse. Further in FIG. 29, a first pair of diametrically opposite notches 202, 204 are provided in the barrel along the outside thereof and extending axially along upper section 180, and a second pair of diametrically opposite notches 206 and 208 are provided in the barrel along the inside thereof and extending axially along upper section 180 and equally spaced circumferentially from the first pair of notches 202 and 204. Ribs 198, 200 are along the outside of the barrel at notches 206, 208.

Figure 28:
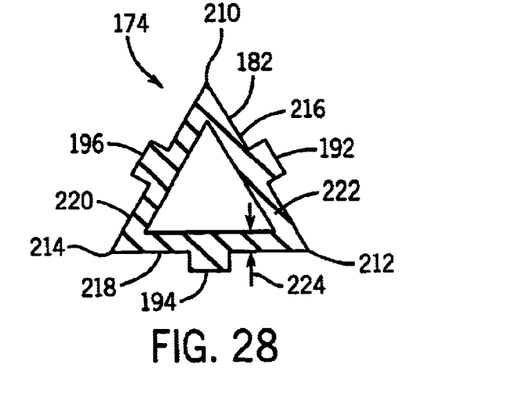
FIG. 28 is a sectional view taken along line 28—28 of FIG. 26.

The noted triangular cross-section of lower section 182, FIG. 28, has three apexes 210, 212, 214, with three respective sides 216, 218, 220, extending therebetween. The noted three ribs 192, 194, 196 extend axially along the respective three sides 216, 218, 220. Barrel 174 has a barrel wall 222 with a wall thickness 224 transverse to axis 178. In a further embodiment, FIG. 30, wall thickness 224 at lower barrel section 182 at the three sides 216, 218, 220 is less than the wall thickness at the three apexes 210, 212, 214, for example as shown at thin tapered wall thickness section 226 as compared to wall thickness section 228, to foster triangular collapse, as shown in dashed line at 230.

In further embodiments, barrel 174 does not have a lower triangular section 182, and instead the barrel has the noted shape of upper section 180 along its entire axial length between upper mouthpiece 172 and lower connecting tube 176, in which embodiment the barrel may have the notch and rib structure described above, for example, FIG. 29. In another embodiment, barrel 174 has the shape of the noted lower section 182 along the entire axial length thereof, in which embodiment the barrel may have the noted rib structure of FIG. 28 or the noted tapered wall thickness structure of FIG. 30. In further embodiments, ribs 186, 188, 190 of FIG. 27 and/or ribs 192, 194, 196 of FIG. 28 and/or ribs 198, 200 of FIG. 29 have the varying radial thickness as they extend axially as shown in FIGS. 17–24, and may also have the remaining features of such ribs as shown in the latter noted figures.

FIG. 31 shows a portion of another teatcup liner 240 including an upper mouthpiece 242, and a barrel 244 depending downwardly from upper mouthpiece 242 and defined by a barrel wall 246. The barrel extends axially along an axis 248 for receiving a teat 22, FIG. 1, inserted axially thereinto through mouthpiece 242. Barrel wall 246 has a wall thickness 250 transverse to axis 248, which wall thickness varies as barrel 244 extends axially. In the preferred embodiment, the wall thickness becomes thinner as the barrel extends axially downwardly away from mouthpiece 242. Further, in the preferred embodiment, a circumferential step 252, preferably an annular step in the case of a round liner, varies the wall thickness of barrel wall 246 as the barrel extends axially downwardly away from mouthpiece 242. Barrel wall 246 has a first wall thickness 254 above step 252, and a second wall thickness 256 below step 252. Wall thickness 256 is less than wall thickness 254. Barrel wall 246 has an inner surface 258 defining a hollow interior 260 in the barrel, and has an outer surface 262 on the opposite side of the barrel wall. Step 252 is in outer surface 262 of barrel wall 246.

It is recognized that various equivalents, alternatives and modifications are possible within the scope of the appended claims.

What is claimed is:

1. A teatcup liner comprising an upper mouthpiece and a barrel depending downwardly from said upper mouthpiece and defined by a barrel wall, said barrel extending axially along an axis for receiving a teat inserted axially thereinto through said mouthpiece, said barrel wall having a wall thickness transverse to said axis, a plurality of ribs extending axially along said barrel wall and having a rib thickness transverse to said axis, wherein at least one of said wall thickness and said rib thickness varies as the respective said barrel and said ribs extend axially.

2. The teatcup liner according to claim 1 wherein said wall thickness varies as said barrel wall extends axially.

3. The teatcup liner according to claim 1 wherein said rib thickness varies as said rib extends axially.

4. The teatcup liner according to claim 1 wherein said wall thickness varies to smaller thicknesses as said barrel wall extends axially away from said mouthpiece.

5. The teatcup liner according to claim 1 wherein said rib thickness varies to larger thicknesses as said rib extends axially away from said mouthpiece.

6. The teatcup liner according to claim 1 wherein in combination both said wall thickness and said rib thickness vary as said barrel wall and said ribs extend axially.

7. The teatcup liner according to claim 6 wherein said wall thickness varies to smaller thicknesses as said barrel wall extends axially away from said mouthpiece and wherein in combination said rib thickness varies to larger thickness as said ribs extend axially away from said mouthpiece.

8. A teatcup assembly comprising an outer teatcup shell having a top end, a teatcup liner in said teatcup shell, said teatcup liner comprising an upper mouthpiece and a barrel depending downwardly from said mouthpiece, said mouthpiece being at said top end of said teatcup shell, said barrel extending axially along an axis for receiving a teat inserted axially thereinto through said mouthpiece, said barrel having a plurality of ribs extending axially therealong and projecting radially outwardly therefrom, a sleeve in said teatcup shell between said teatcup shell and said barrel, said sleeve engaging said ribs.

9. The teatcup assembly according to claim 8 wherein said sleeve is mounted to said teatcup liner at said ribs and circumscribes said barrel, said sleeve and said teatcup liner being insertable as a unit into said teatcup shell, and removable as a unit from said teatcup shell.

10. The teatcup assembly according to claim 8 wherein said sleeve comprises a tubular member axially insertable into said teatcup shell.

11. The teatcup assembly according to claim 8 wherein said sleeve comprises a tubular member having a plurality of axially extending slots receiving said ribs.

12. The teatcup assembly according to claim 11 wherein said slots have first open axial ends receiving said ribs axially slidable thereinto, and distally opposite second closed axial ends blocking axial sliding of said ribs therepast.

13. The teatcup assembly according to claim 12 wherein said sleeve has a top end at said first open axial ends of said slots, and has a bottom end axially spaced below said second closed axial ends of said slots, and wherein said sleeve has a portion between said second closed axial ends of said slots and said bottom end of said sleeve which is a continuous band around the perimeter of said sleeve structurally supporting portions of said sleeve extending axially upwardly thereform between said slots, such that said sleeve is a one-piece member.

14. The teatcup assembly according to claim 12 wherein said first open axial ends of said slots have beveled entrance openings receiving and guiding said ribs therein.

15. The teatcup assembly according to claim 8 wherein said barrel has a barrel wall with a wall thickness transverse to said axis, said ribs have a rib thickness transverse to said axis, and wherein at least one of said wall thickness and said rib thickness varies as the respective said barrel and said ribs extend axially.

16. The teatcup assembly according to claim 15 wherein in combination said wall thickness varies to smaller thicknesses as said barrel extends axially away from said mouthpiece, and said rib thickness varies to larger thicknesses as said ribs extend axially away from said mouthpiece.

17. A teatcup liner comprising an upper mouthpiece and a barrel depending downwardly from said upper mouthpiece, said barrel extending axially along an axis for receiving a teat inserted axially thereinto through said mouthpiece, said barrel having an upper section and a lower section, said upper section being round in lateral cross-section taken transversely to said axis, said lower section being triangular in lateral cross-section taken transversely to said axis.

18. The teateup liner according to claim 17 comprising a plurality of ribs extending axially along said barrel along at least one of said upper and lower sections.

19. The teatcup liner according to claim 18 comprising three said ribs along said upper section.

20. The teatcup liner according to claim 18 comprising two said ribs along said upper section.

21. The teatcup liner according to claim 20 comprising two notches in said barrel along said upper section, said ribs being diametrically opposite each other, said notches being diametrically opposite each other.

22. The teatcup liner according to claim 20 comprising a first pair of diametrically opposite notches in said barrel along the outside thereof along said upper section, a second pair of diametrically opposite notches in said barrel along the inside thereof along said upper section and equally spaced circumferentially from said first pair of notches, said ribs being along said outside of said barrel at said second pair of notches.

23. The teatcup liner according to claim 18 comprising three said ribs along said lower section.

24. The teatcup liner according to claim 23 wherein said triangular cross-section has three apexes with three respective sides extending therebetween, and wherein said three ribs extend axially respectively along said three sides.

25. The teatcup liner according to claim 17 wherein said triangular cross-section has three apexes with three respective sides extending therebetween, and wherein said barrel has a barrel wall with a wall thickness transverse to said axis, and the wall thickness at said lower section at said three sides is less than the wall thickness at said three apexes.

26. A teatcup liner comprising an upper mouthpiece and a barrel depending downwardly from said upper mouthpiece, said barrel extending axially along an axis for receiving a teat inserted axially thereinto through said mouthpiece, and comprising two ribs extending axially along said barrel and two notches extending axially along said barrel said ribs being diametrically opposite each other, said notches being diametrically opposite each other.

27. The teatcup liner according to claim 26 wherein said notches comprise a first pair of diametrically opposite notches in said barrel extending axially along the outside thereof, and comprising a second pair of diametrically opposite notches in said barrel extending axially along the inside thereof and equally spaced circumferentially from said first pair of notches, and wherein said ribs extend axially along the outside of said barrel at said second pair of notches.

28. A teatcup liner comprising an upper mouthpiece and a barrel depending downwardly from said upper mouthpiece and defined by a barrel wall, said barrel extending axially along an axis for receiving a teat inserted axially thereinto through said mouthpiece, said barrel being triangular in lateral cross-section taken transversely to said axis, said triangular cross-section having three apexes with three respective sides extending therebetween, and wherein said barrel wall has a wall thickness transverse to said axis, and said wall thickness tapers at said three sides to a smaller thickness than at said three apexes.

* * * * *